United States Patent
Hirabayashi

[11] Patent Number: 6,000,654
[45] Date of Patent: Dec. 14, 1999

[54] SLIDABLE TAPE DRIVE ASSEMBLY

[75] Inventor: Toshio Hirabayashi, Koshigaya, Japan

[73] Assignee: Aiwa Co. Ltd., Tokyo, Japan

[21] Appl. No.: 09/028,557

[22] Filed: Feb. 24, 1998

[51] Int. Cl.[6] .................................................. G11B 23/04
[52] U.S. Cl. ...................................... 242/338.4; 360/96.5
[58] Field of Search ................................ 242/338.4, 338; 360/85, 95, 96.5, 96.6

[56] References Cited

U.S. PATENT DOCUMENTS

| | | | |
|---|---|---|---|
| 4,065,800 | 12/1977 | Wilson et al. | 242/339 X |
| 5,025,332 | 6/1991 | Tsuchida et al. | 360/85 |

Primary Examiner—John Q. Nguyen
Attorney, Agent, or Firm—Fulbright & Jaworski LLP

[57] ABSTRACT

A cartridge tape drive assembly for use with a cartridge tape, includes a housing having an opening to receive the cartridge tape, and a slidable tape drive and mounting assembly for adjusting the position of the cartridge tape inwardly while in the tape drive and outwardly for removal of the cartridge tape. The housing includes a support tray having elongated apertures for joining the tape drive to the support tray and allowing the tape drive to move inwardly and outwardly relative to the support tray. The slidable tape drive and mounting assembly includes a connector for joining the tape drive along the elongated apertures, and a latch device for adjusting the position of the tape drive along the elongated apertures. The cartridge is in operative engagement in the tape drive, i.e., in operative engagement with a magnetic head in the tape drive, during the inward and outward movement.

10 Claims, 4 Drawing Sheets

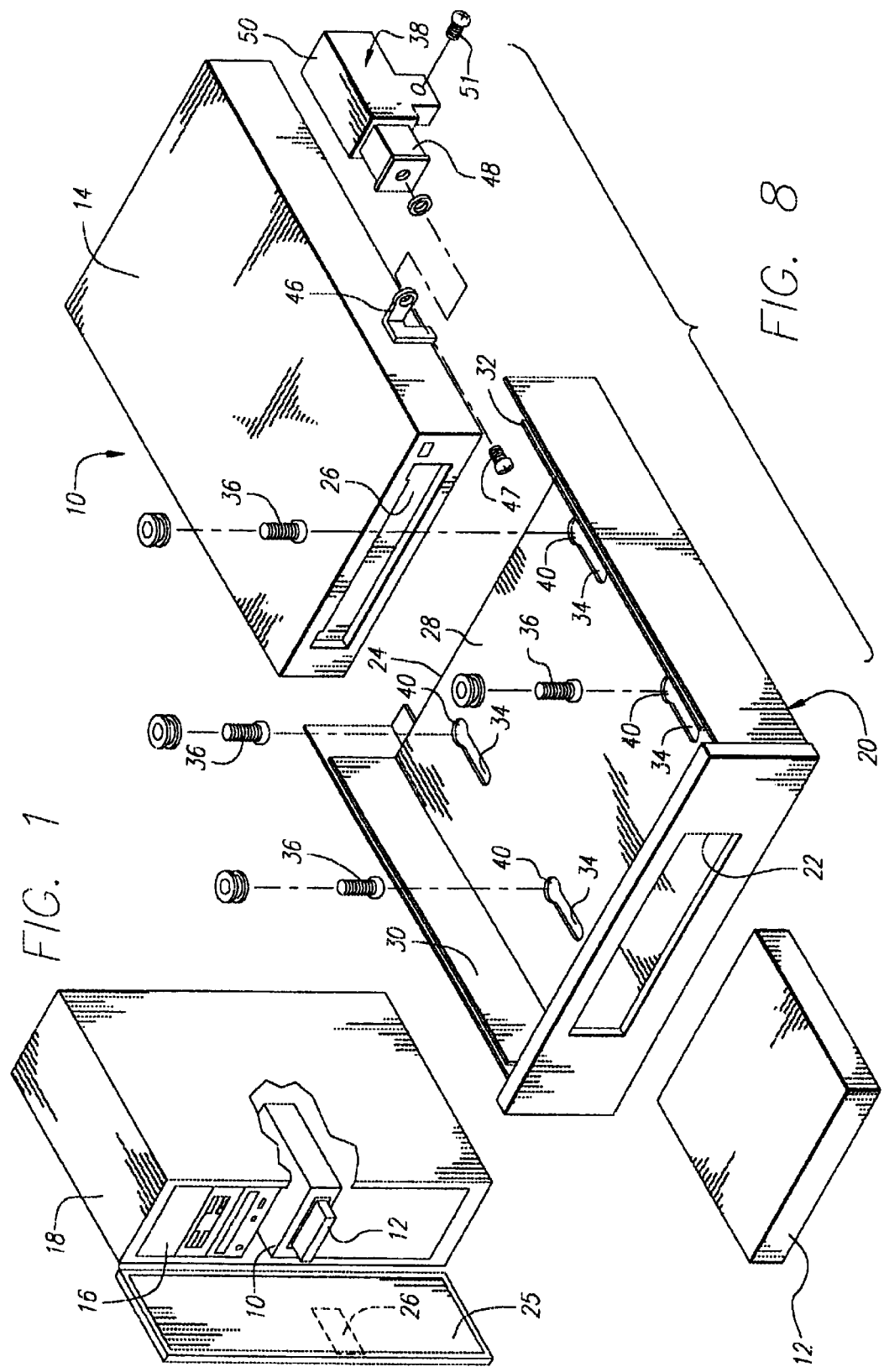

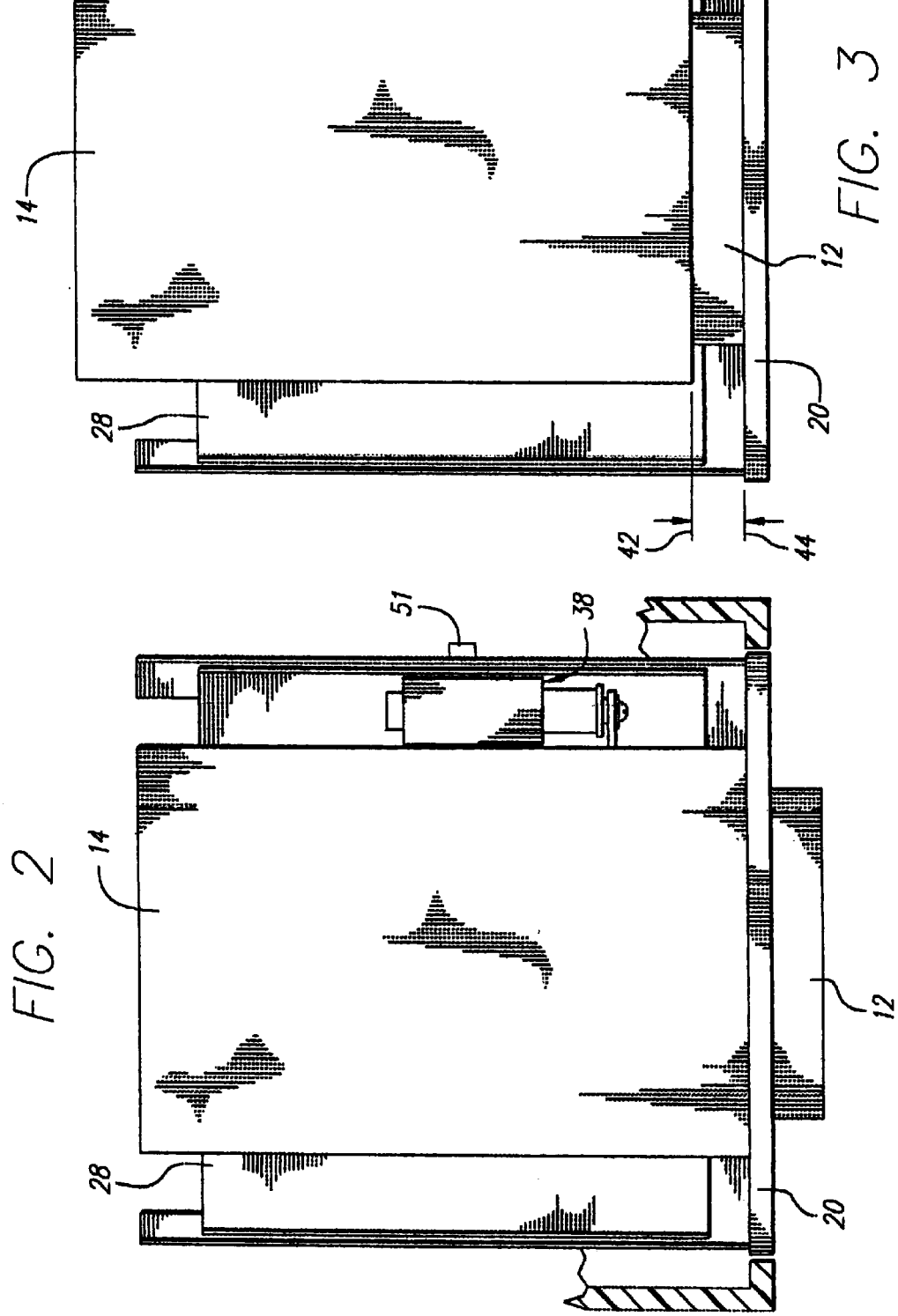

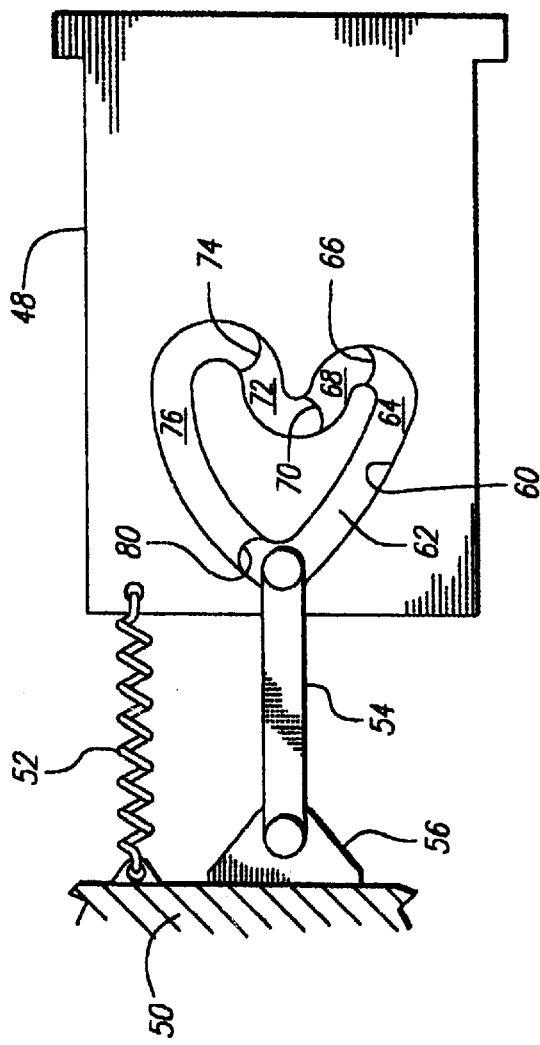
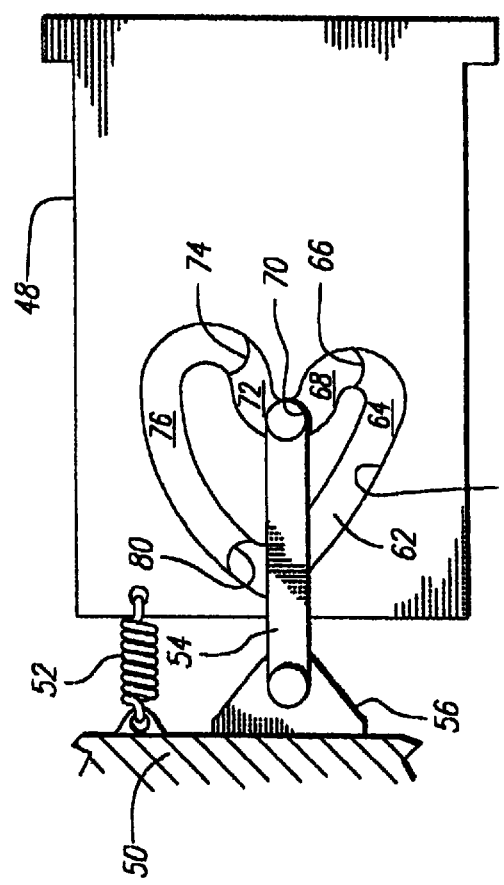
FIG. 7A
FIG. 7B

SLIDABLE TAPE DRIVE ASSEMBLY

BACKGROUND OF THE INVENTION

1. Field of the Invention

The present invention relates generally to cartridge tape drives, and more particularly to a cartridge tape drive having a slidable assembly for maintaining a tape cartridge positioned completely within an enclosure during operation.

2. Description of the Prior Art

Magnetic tape storage devices are commonly used for the storage of large amounts of digital data because they provide an economical and reliable means for temporary and permanent storage. Because magnetic tape systems inherently rely on serial recording, access times are substantially longer than other modern storage devices, but at the same time the danger of catastrophic failure is virtually absent. Thus it has become common practice to utilize tape systems as data backup for floppy disk and hard disk files, typically by reading out the entire contents of a random access memory system at the end of the day or other operating period, and retaining this data in storage until the next backup date or time.

In conventional tape drive systems, a tape cartridge is inserted and retained in the tape drive for record and/or playback functions. The tape cartridge used for these applications is typically 3.25 inches by 2.5 inches by 0.5 inches. During operation, the tape is positioned partly within the tape drive assembly and partly outside the tape drive assembly. In particular, the tape cartridge typically protrudes from the face of the tape drive assembly one-half inch or more. Since the tape cartridge protrudes from the face of the tape drive assembly, the tape cartridge is subject to interference from others who may accidently bump into the tape while it is recording. Since such tapes are typically used for backing up a system overnight or for long periods of time, the chance for disruption can be high.

Moreover, although the conventional configuration allows a user the ability to access the tape cartridge via the protruding portion of the tape cartridge, this configuration nonetheless is undesirable in view of the design of today's computers. In particular, it is desirable to have peripheral components, such as floppy discs, tape cartridge and so forth be flush with the instrument face of the computer or even somewhat behind that position. In addition to the aesthetic advantage of the tape cartridge being more hidden from view during operation, or even behind a hinged front door for the computer, such a configuration minimizes the chances of the tape cartridge being disturbed during operation since it is no longer protruding.

What is needed therefore is a tape cartridge drive which includes a mechanism for maintaining a tape cartridge positioned in non-protruding fashion during operation.

SUMMARY OF THE INVENTION

The preceding and other shortcomings are overcome by the present invention which provides a cartridge tape drive assembly for use with a tape cartridge, including a housing having an opening to receive the tape cartridge, and a slidable tape drive and mounting assembly for adjusting the position of the tape cartridge inwardly while in the tape drive and outwardly for removal of the cartridge. The housing includes a support tray having elongated apertures for joining the tape drive to the support tray and allowing the tape drive to move inwardly and outwardly relative to the support tray. The slidable tape drive and mounting assembly includes a connector for joining the tape drive along the elongated apertures, and a latch device for adjusting the position of the tape drive along the elongated apertures.

In another aspect, the present invention provides a cartridge tape drive assembly for use with a tape cartridge, including a housing having an opening to receive the tape cartridge, and a movable tape drive and mounting assembly for moving the tape cartridge inwardly while in the tape drive, with the housing including a base plate having at least one slotted portion for joining the tape drive to the base plate and allowing the tape drive to move inwardly and outwardly relative to the base plate, a connector joining the tape drive along the slotted portion, and a means for adjusting the position of the tape drive along the slotted portion.

The foregoing and additional features and advantages of this invention will become apparent from the accompanying drawing figures and the detailed description that follows. In the figures and written description, numerals indicate the various features of the invention, like numerals referring to like features throughout for both the drawing figures and the written description.

BRIEF DESCRIPTION OF THE DRAWINGS

FIG. 1 is a perspective view of a tape cartridge drive assembly incorporated in a computer, showing a cartridge tape in operative engagement in the tape drive but before sliding of the tape drive with the cartridge into their inward position, in accordance with a preferred embodiment of the present invention;

FIG. 2 is a top, cross-sectional view of the tape cartridge drive assembly and cartridge tape of FIG. 1;

FIG. 3 is a top, cross-sectional view of the tape cartridge drive assembly and cartridge tape after they have slid into their inward position.

FIG. 7a is a detailed view showing a portion of a latch assembly in the cartridge tape assembly, in its unlatched configuration, and FIG. 7b shows the latch assembly in its latched configuration; and FIG. 8 is an exploded, perspective view of the tape drive assembly illustrated in FIG. 1.

DETAILED DESCRIPTION OF THE INVENTION

Figure 6:
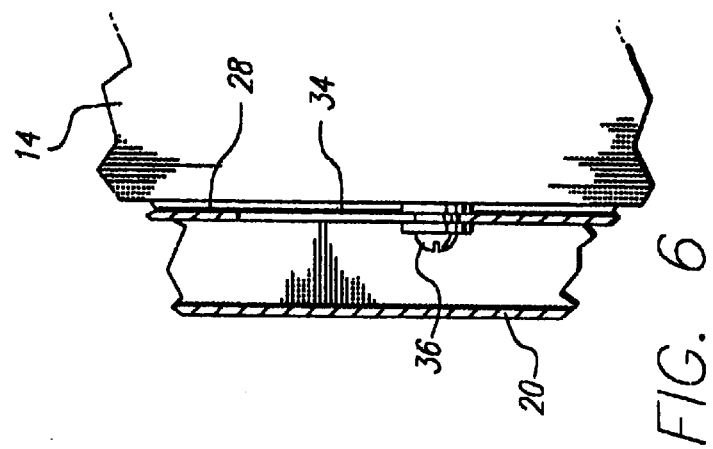
FIG. 6 is a detailed, cross-sectional view of one slotted hole assembly illustrated in FIG. 5.

As is illustrated in FIGS. 1 and 8, the present invention provides a tape cartridge drive assembly 10 for use with a cartridge tape 12, which includes a slidable tape drive and mounting assembly for maintaining the tape cartridge 12 positioned within the cartridge tape drive 14 during operation. With the tape cartridge 12 positioned within the tape drive 14 during operation, the tape cartridge is also preferably generally flush with or even somewhat inward of the face 16 of the computer 18. Therefore, the chance of the tape cartridge 12 being disturbed by outside disturbances during operation is minimal. The cartridge tape drive assembly 10 includes a slidable drive tape drive and mounting assembly for slidably adjusting the tape drive 14 of the assembly inward or outward as required.

Referring to FIGS. 2 and 8, the cartridge tape drive assembly 10 includes a housing 20 having an opening 22 dimensioned to receive the tape cartridge 12 endwise and a base plate 24 for supporting the tape cartridge 12 (in the tape drive 14) within the housing 20. The computer 18 in FIG. 1 is shown with a hinged door 25 having a handle 26. With the arrangement and mechanism described here, with the cartridge 12 in its fully inserted position for operation, the tape drive 14 with the tape cartridge 12, slides sufficiently inwardly so that the tape cartridge 12 does not interfere with the closing of the computer door 25.

The base plate 24 of the housing 20 has an inside surface 28 (for receiving the tape drive 14). The housing also has two side plates 30 and 32. The side plates 30 and 32 are positioned generally perpendicular to the inside surface 28 of the base plate 24, which is disposed generally horizontally to receive the tape drive 14.

It should be noted that this invention is directly mainly to a tape drive assembly 10, incorporating a slidable capability, such that the tape cartridge 12, in operative engagement in the tape drive assembly 10, with the tape drive assembly 10 slid to its inward position, will be disposed within the enclosure of the computer 18 with the door 25 closed. As this is illustrated (e.g. FIG. 3), the outward face of the tape cartridge 12, in this circumstance, is essentially aligned with the inside surface of the front panel of the housing 20. However, the outward face of the tape cartridge 12 could also be slightly inward of that position. It could even be slightly outward of the outside surface of the front panel so long as the door 25 has room to close. The present invention is directed toward the slidable assembly for moving the tape cartridge 12 inwardly within the housing 20. This is done after the cartridge is inserted into operative engagement in the tape drive assembly 10, i.e., in operative engagement with a magnetic head in the tape drive assembly 10 (not shown). There is no detailed description of the function and operation of the cartridge tape drive 14. Similarly, although the magnetic head (not shown) is mounted in the tape drive in such a manner as to allow the magnetic head to be moved between various tracks on the tape cartridge 12, there is no detailed description of the mounting or track adjusting mechanism. This is because these elements are unnecessary to understanding the invention and may vary depending on the desired function of any given drive embodying the present invention. One skilled in the art will thus recognize that the cartridge tape drive 14 and tape cartridge 12 illustrated and described herein are not limited to the particular embodiments presented herein.

Moreover, the present invention is not limited to slidably adjusting the tape drive 14 for a particular tape cartridge 12. Rather, the present invention may be adapted to slidably adjusting the position of varied tape cartridges, including those in development. For illustrative purposes, however, the present invention is illustrated with the Travan minicartridge, model TR-4, manufactured by Imation Corporation of St. Paul, Minn.

Figure 5:
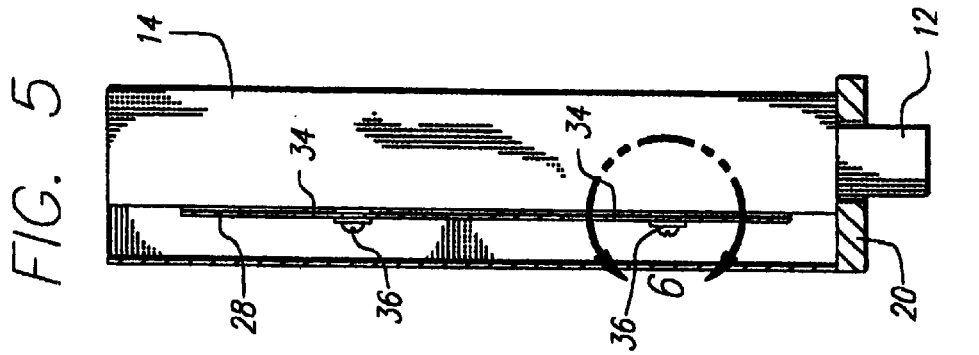
FIG. 5 is a side, cross-sectional view of the cartridge tape drive assembly and tape cartridge of FIG. 1
Figure 4:
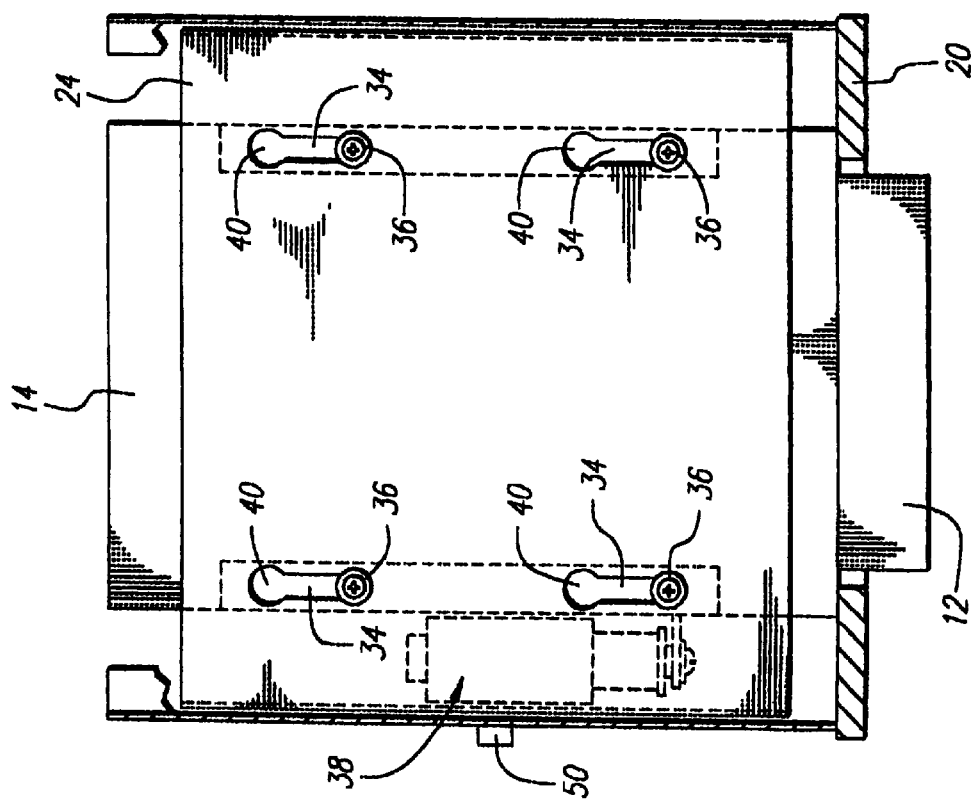
FIG. 4 is a bottom, cross-sectional view of the cartridge tape drive, assembly and tape cartridge of FIG. 1.

Referring to FIG. 8, the tape drive slide assembly 10 incorporates apertures having slot portions 34, tracking connectors 36 and a latch assembly 38. As is illustrated in detail in FIG. 4, the slot portions 34 of the apertures are through the base plate 24, with each slot portion 34 opening into a generally circular portion 40. Although it is preferable to implement the present invention utilizing four apertures with slot portions 34, one skilled in the art will recognize that the present invention may be utilized with any number as long as the tape drive 14 can be slidably adjusted within the tape drive assembly housing 20. Tracking connectors 36 are utilized to engage the inside surface 28 of the base plate 24 to the tape drive 14 while allowing the tape drive 14 to slidably move inward and outward (forward and backward) in the vicinity of the opening 22 of the tape drive assembly 10 as illustrated in FIGS. 2 and 3. One skilled in the art will recognize that the distance the tape drive 14 can be adjusted is defined by the length of the slot portions 34. It is generally preferable to configure the slot portions 34 such that the tape cartridge 12, when it is fully inserted for operation, is substantially flush with the inside surface of the front panel of the housing 20, as in FIG. 3, or in the range of slightly inward of that position to slightly outward from the outside surface of the front panel. Referring to FIGS. 4–6, the tracking connectors 36 are connected through the apertures to the underside of the tape drive 14. The tracking connectors 36 are preferably screws or the like which allow the movement of the tape drive 14 along the slotted portions 34. The tracking connectors 36 should be of a length which would allow retention of the tape drive 14 while not interfering with the operation of the tape drive 14.

The stationary housing (or tray) 20 receives the tape drive 10 and the tape cartridge 12 such that the cartridge tape 12 can be easily inserted and removed. The slot portions 34 allow the tape drive 14 to move generally horizontally inward and outward (back and forth) between the inward and outward positions indicated at 42 and 44 respectively in FIG. 3. In particular, the tape drive 14 moves along each slotted portion 34 generally horizontally, retained by the tracking connector screws 36 in the apertures having slot portions 34.

As is illustrated in FIGS. 2–4, 7a, 7b and 8, the latch assembly 38 is connected along a side portion of the tape drive 14 via a connecting bar 46. Referring to FIG. 8, a connector device 47, such as a screw, retains the connecting bar 46 that is disposed on the tape drive 14 and the latch assembly 38 together. Referring to FIGS. 7a and 7b, they show the latch 48 of the latch assembly 38 and other associated parts, in plan views from the top (with, however, the inside rear of the housing 50 represented somewhat schematically in cross-section). The rest of the housing for the latch assembly, and other parts of the apparatus, not part of the latch assembly, are omitted from these views for convenience of illustration and understanding.

The latch assembly 38 is also connected to one side plates portion 32 of the housing (or tray) 20 by another connecting device 51, typically a screw. As is illustrated in FIGS. 7a and 7b, the latch assembly 38 includes a spring 52 for allowing the latch 48 of the assembly 38 to be retained in unlatched and latched positions as illustrated by the tape drive positions of FIGS. 2 and 3. In particular, referring to FIGS. 2 and 7a, the latch assembly 38 is disposed in its non-retracted (unlatched) position with the tape drive 14 slid outward. At this position, the spring 52 in the latch assembly 38 is not fully compressed. Referring to FIG. 3, with the tape drive 14 slid inward, the spring 52 in the latch assembly 38 is fully compressed, as in FIG. 7b. Thus, when the tape drive 14 is pushed back into the housing 20, a force is exerted against the spring 52. When a user desires to remove the tape cartridge 12, the cartridge tape 12 is depressed inwardly, toward the rear of the housing 20, thus pushing inwardly on the tape drive, releasing the tension on the spring 52, which then drives the tape drive 14, outwardly.

Referring to FIGS. 7a and 7b in more detail, the latch assembly is conventional, incorporating a design and parts that are commonly used in cabinet latches. A U-shaped wire member 54 (with the open side facing downward in these figures) has one leg inserted in an opening through a housing connector 56 along the inside rear of the latch assembly housing 50 and the other leg fitted in a generally heartshaped groove 60 cut into the latch 48. The groove has a floor 62 formed with a series of ramps and steps. In a counterclockwise direction, there is an initial 64 upward ramp to an initial step downward indicated at 66. From that drop, there is a lead-in intermediate 68 upward ramp to a lead-in intermediate step downward indicated at 70. From that drop, there is then a lead-out 72 upward ramp to a lead-out step downward indicated at 74. From that drop, there is a final 76 upward ramp to a final step downward, indicated at 80. In latching inward, as in FIG. 7*b*, and unlatching outward, as in FIG. 7*a*, the outer leg of the U-shaped wire member 54 rides in the groove 60 with its end generally running along the floor 62, up the ramps and down the steps. Although found not to be necessary, and not shown, another spring can be employed to provide downward pressure on the U-shaped wire in assuring it maintains its proper position. This would be a spring attached at one of its ends, near the middle of the base of the U-shaped wire member 54, and at its other end, to the inside floor of the housing 50 for the latch assembly 38.

In going from the unlatched position of FIG. 7*a* to the latched position of FIG. 7*b*, the inward force on the latch 48 causes the outer side of the U-shaped wire member 54 in the groove of the latch, relative to the inwardly moving groove, to ride up the initial ramp 60 and down the initial step at 66. Upon release, the outward force of the spring 52 on the latch causes that side of the member, relative to the groove, to ride down the lead-in intermediate step 70 and come to rest in the latched position of FIG. 7*b*.

In going from the latched position of FIG. 7*b* to the unlatched position of FIG. 7*a*, the inward force on the latch 48, pushing the latch somewhat inwardly, results in the side of the outer U-shaped wire member 54, relative to the groove, riding up the lead-out intermediate ramp 72 and down the step at 74. Then, upon release, the outward force from the spring 52, pushing the latch 48 outward, causes the side of the outer U-shaped wire member in the groove, relative to the groove, to ride up the final ramp 76 and down the final step 80 to the unlatched position of FIG. 7*a*.

One skilled in the art will recognize that the latch assembly 38 is not limited to the configuration illustrated in FIGS. 7*a*, 7*b* and 8. Rather, any latch assembly suitable for allowing the tape drive 14 to appropriately slidably adjust may be utilized.

It will be appreciated by persons skilled in the art that the present invention is not limited to what has been shown and described herein above, nor any particular dimensions or sizes. For example, the present invention may be used with tape drives and cartridges currently available or in development. The scope of the invention is limited solely by the claims which follow.

What is claimed is:

1. A cartridge tape drive assembly for use with a tape cartridge, comprising:

a housing having an opening to receive the tape cartridge;

a slidable tape drive adapted to receive the tape cartridge via said opening for adjusting the position of the tape cartridge inwardly or outwardly with respect to said housing, said slidable tape drive including a tape reading head and being slidably positioned within said housing; and a mounting assembly adapted to couple said slidable tape drive to said housing.

2. The cartridge tape drive assembly claimed in claim 1, wherein said housing includes a support tray having elongated apertures for joining said tape drive to said support tray and allowing said tape drive to move inwardly and outwardly relative to said housing along said support tray.

3. The cartridge tape drive mounting assembly claimed in claim 2, wherein said mounting assembly comprises:

a connector for joining said tape drive with said support tray through the elongated apertures; and a latch assembly adapted to couple said tape drive to said housing for adjusting the position of the tape drive along said elongated apertures.

4. The cartridge tape drive assembly claimed in claim 3, wherein said elongated apertures comprise slot portions.

5. The cartridge tape drive assembly claimed in claim 3, wherein said support tray comprises:

a base plate having first and second sides;

a first side plate disposed substantially perpendicular to and connected to said base plate near said first side of said base plate; and a second side plate disposed substantially perpendicular to and connected to said base plate near said second side of said base plate, wherein said latch assembly is connected to said second side plate.

6. A cartridge tape drive assembly for use with a tape cartridge, comprising:

a housing having an opening to receive the tape cartridge; and a movable tape drive adapted to receive the tape cartridge via said opening and coupled to said housing for moving the tape cartridge inwardly or outwardly relative to said housing said tape drive including a tape reading head and being movably positioned within said housing;

wherein said housing includes, a base plate including at least one slotted portion for joining said tape drive to said base plate and allowing said tape drive to move inwardly and outwardly relative to said base plate along said slotted portion, a connector for joining said base plate with said tape drive through said slotted portion, and a means for adjusting the position of said tape drive along said slotted portion.

7. The cartridge tape drive assembly claimed in claim 6, wherein said means for adjusting the position of said tape drive along said slotted portion comprises a latch assembly.

8. The cartridge tape drive assembly claimed in claim 6, wherein said at least one slotted portion has an elongated aperture.

9. The cartridge tape drive assembly claimed in claim 6, wherein said base plate includes at least four slotted portions.

10. The cartridge tape drive assembly claimed in claim 6, wherein said means for adjusting the position of said tape drive along said slotted portion is fixed to said tape drive and to said housing.

* * * * *